(12) United States Patent
Jordan et al.

(10) Patent No.: US 11,346,284 B1
(45) Date of Patent: May 31, 2022

(54) GAS TURBINE ENGINE WITH PYROTECHNIC AIR STARTER

(71) Applicant: Rolls-Royce North American Technologies Inc., Indianapolis, IN (US)

(72) Inventors: Matthew Jordan, Indianapolis, IN (US); Kerry J. Lighty, Plainfield, IN (US); Paul O'Meallie, Brownsburg, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/192,447

(22) Filed: Mar. 4, 2021

(51) Int. Cl.
*F02C 7/272* (2006.01)
*F02C 7/27* (2006.01)

(52) U.S. Cl.
CPC ............... *F02C 7/272* (2013.01); *F02C 7/27* (2013.01); *F05D 2220/323* (2013.01); *F05D 2230/60* (2013.01)

(58) Field of Classification Search
CPC .................................. F02C 7/272; F02C 7/27
See application file for complete search history.

(56) References Cited

U.S. PATENT DOCUMENTS

| | | | |
|---|---|---|---|
| 2,457,833 A | 1/1949 | Redding | |
| 2,941,790 A * | 6/1960 | Compton | F02C 6/04 |
| | | | 432/187 |
| 2,985,104 A * | 5/1961 | Fox | F02C 7/277 |
| | | | 102/531 |
| 3,016,227 A | 1/1962 | Lawrence et al. | |
| 3,232,775 A | 6/1967 | Snell | |
| 3,462,071 A * | 8/1969 | Garve | F04D 27/0238 |
| | | | 415/116 |
| 4,062,186 A * | 12/1977 | Snow | F02C 7/275 |
| | | | 60/226.1 |
| 5,054,283 A | 10/1991 | Jones | |
| 5,263,315 A | 11/1993 | Shekleton et al. | |
| 5,343,690 A | 9/1994 | Shekleton et al. | |
| 6,644,033 B2 | 11/2003 | Daggett | |
| 6,941,760 B1 | 9/2005 | Jones | |
| 7,896,620 B1 * | 3/2011 | Ewing, Jr. | F01D 5/048 |
| | | | 416/231 R |
| 2003/0131607 A1* | 7/2003 | Daggett | F02C 7/27 |
| | | | 60/778 |
| 2005/0217530 A1 | 10/2005 | Soulie et al. | |
| 2010/0326086 A1* | 12/2010 | Khosid | F02C 7/272 |
| | | | 60/778 |
| 2016/0368614 A1* | 12/2016 | Endres | F02C 7/27 |

* cited by examiner

*Primary Examiner* — Gerald L Sung
(74) *Attorney, Agent, or Firm* — Barnes & Thornburg LLP (57) ABSTRACT

A gas turbine engine includes a bypass duct, a compressor, and a pyrotechnic gas conduit. The bypass duct conducts bypass air between an outer bypass wall and an inner bypass wall. The compressor includes an impeller to compress engine air. The pyrotechnic gas conduit is configured to conduct a gas onto the impeller to start the gas turbine engine.

16 Claims, 6 Drawing Sheets

GAS TURBINE ENGINE WITH PYROTECHNIC AIR STARTER

FIELD OF THE DISCLOSURE

The present disclosure relates generally to gas turbine engines, and more specifically to starting systems for gas turbine engines.

BACKGROUND

Gas turbine engines are used to power aircraft, watercraft, and power generators. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To start a gas turbine engine, a device may be used to rotate the compressor, thus starting the process of compressing air and providing compressed air to the combustor. In some gas turbine engine applications, the compressor is coupled directly or indirectly to an accessory gearbox that provides mechanical drive to rotate the compressor. The gearbox can be coupled to a motor or air turbine starter to provide the initial drive and power to the gearbox. Even still, there remains a desire to improve and simplify starting devices for gas turbine engines.

SUMMARY

The present disclosure may comprise one or more of the following features and combinations thereof.

A gas turbine engine having a pyrotechnic starter may include a bypass duct, a compressor, and a pyrotechnic gas conduit. The bypass duct is configured to conduct bypass air through the gas turbine engine to provide thrust for propelling the gas turbine engine. The bypass duct includes an inner bypass wall arranged circumferentially about an axis and an outer bypass wall arranged circumferentially about the inner bypass wall to define a passageway for the bypass air radially between the outer bypass wall and the inner bypass wall. The compressor is configured to produce compressed air and is located radially inward of the inner bypass wall. The compressor may include an impeller configured to rotate about the axis to produce the compressed air and an impeller shroud arranged circumferentially around the impeller to block the compressed air from flowing away from the impeller. The pyrotechnic gas conduit extends radially inward through the outer bypass wall and the inner bypass wall and into the impeller shroud to conduct a gas through the bypass duct and the impeller shroud and onto the impeller to rotate the impeller about the axis for starting the gas turbine engine.

In some embodiments, the pyrotechnic gas conduit extends along a straight path between the outer bypass wall and the impeller shroud. In some embodiments, the outer bypass wall is formed to define an outer bypass bore that extends radially through the outer bypass wall. The bypass duct may include a tube mount coupled with the pyrotechnic gas conduit and located in the outer bypass bore. The tube mount includes a tube collar that extends circumferentially around the pyrotechnic gas conduit and a first seal that engages the tube collar and the outer bypass wall to block the bypass air from passing through the outer bypass bore.

In some embodiments, the impeller shroud is formed to define a shroud bore that extends radially into the impeller shroud. The pyrotechnic gas conduit is received in the shroud bore. The impeller shroud further includes a second seal that engages the pyrotechnic gas conduit and the impeller shroud to block engine air from passing through the shroud bore.

In some embodiments, the shroud bore includes an outer bore, an inner bore, and a locating land between the outer bore and the inner bore. The pyrotechnic gas conduit engages the locating land to position the pyrotechnic gas conduit relative to the impeller.

In some embodiments, the inner bypass wall is formed to define an inner bypass bore that extends radially through the inner bypass wall. The pyrotechnic gas conduit extends through the inner bypass bore to form an air gap in the inner bypass bore between the inner bypass wall and the pyrotechnic gas conduit.

In some embodiments, the pyrotechnic gas conduit includes a tube and a nozzle. The nozzle may be coupled to the tube that extends through the outer bypass wall and the inner bypass wall and the impeller shroud to accelerate air onto the impeller.

In some embodiments, the outer bypass wall is formed to define an outer bypass bore with a first diameter that extends radially through the outer bypass wall. The inner bypass wall is formed to define an inner bypass bore with a second diameter that extends radially through the inner bypass wall. The impeller shroud is formed to define a shroud bore with a third diameter that extends radially into the impeller shroud. The first diameter may be larger than the second diameter and the second diameter may be larger than the third diameter.

In some embodiments, the nozzle has an outer diameter. The outer diameter may be smaller than the first diameter, the second diameter, and the third diameter so that the pyrotechnic gas conduit can be assembled and extended through each of the outer bypass bore, the inner bypass bore, and the shroud bore.

In some embodiments, the nozzle is integrally formed with the impeller shroud. The tube may be coupled directly to the impeller shroud.

According to another aspect of the present disclosure, a gas turbine engine may include a bypass duct, a compressor, and a pyrotechnic gas conduit. The bypass duct includes an inner bypass wall arranged circumferentially about an axis and an outer bypass wall arranged circumferentially about the inner bypass wall. The compressor may include an impeller configured to rotate about the axis and an impeller shroud arranged circumferentially around the impeller. The pyrotechnic gas conduit extends radially inward through the outer bypass wall and the inner bypass wall and into the impeller shroud to conduct a gas onto the impeller.

In some embodiments, the pyrotechnic gas conduit includes a tube and a nozzle. The nozzle may be coupled to the tube and the impeller shroud to accelerate air onto the impeller.

In some embodiments, the outer bypass wall is formed to define an outer bypass bore with a first diameter. The inner bypass wall is formed to define an inner bypass bore with a second diameter. The impeller shroud is formed to define a shroud bore with a third diameter. The first diameter may be larger than the second diameter and the second diameter may be larger than the third diameter.

In some embodiments, the outer bypass bore, the inner bypass bore and the shroud bore are aligned. As such, the pyrotechnic gas conduit extends along a straight path through each of the outer bypass bore, the inner bypass bore and the shroud bore.

In some embodiments, the outer bypass wall is formed to define an outer bypass bore and the bypass duct further includes a tube mount coupled with the pyrotechnic gas conduit and located in the outer bypass bore. The tube mount includes a tube collar that extends circumferentially around the pyrotechnic gas conduit and a first seal that engages the tube collar and the outer bypass wall.

In some embodiments, the impeller shroud is formed to define a shroud bore. The pyrotechnic gas conduit is received in the shroud bore. The impeller shroud further includes a second seal that engages the pyrotechnic gas conduit and the impeller shroud.

According to another aspect of the present disclosure, a method of assembling a gas turbine engine may include a number of steps. The method may include arranging a bypass duct circumferentially around an axis, the bypass duct including an outer bypass wall and an inner bypass wall radially inward of the outer bypass wall so that bypass air can flow therebetween, arranging a compressor radially inward of the bypass duct, the compressor having an impeller configured to rotate around the axis and compress engine air and an impeller shroud arranged circumferentially about the impeller, and extending a pyrotechnic gas conduit radially inward through the bypass duct and into the impeller shroud.

In some embodiments, the pyrotechnic gas conduit includes a tube and a nozzle. The tube extends through the outer bypass wall and the inner bypass wall. The nozzle couples to the tube and the impeller shroud is configured to accelerate gas onto the impeller.

In some embodiments, the outer bypass wall is formed to include a first bore with a first diameter that extends radially through the outer bypass wall. The inner bypass wall is formed to include a second bore with a second diameter that extends radially through the inner bypass wall. The impeller shroud is formed to include a third bore with a third diameter that extends radially through the impeller shroud. The first diameter may be larger than the second diameter and the second diameter may be larger than the third diameter.

In some embodiments, the method further includes the step of slideably engaging the pyrotechnic gas conduit with a tube mount that engages the pyrotechnic gas conduit and the outer bypass wall to block the bypass air through the first bore. The method may include slideably engaging the pyrotechnic gas conduit with a second seal that engages the pyrotechnic gas conduit and the impeller shroud to block engine air through the third bore. The tube mount may include a tube collar that extends circumferentially around the pyrotechnic gas conduit and a first seal that engages the tube collar and the outer bypass wall.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
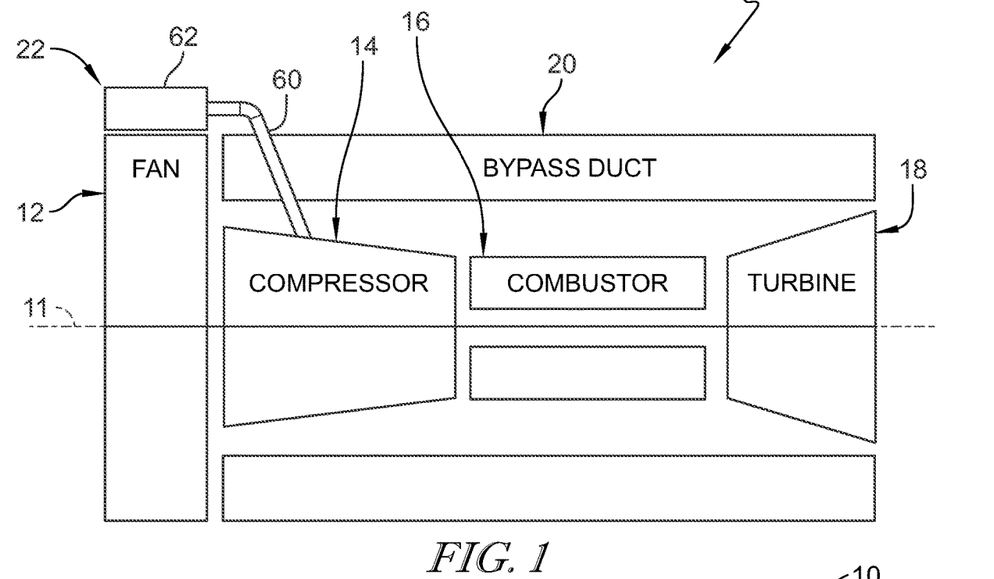
FIG. 1 is a diagrammatic view of a gas turbine engine that includes a fan, a compressor, a combustor, a turbine, and a bypass duct located circumferentially around the compressor, the combustor, and the turbine, and the gas turbine engine further includes a pyrotechnic gas starter that extends through the bypass duct and into the compressor to supply high-pressure air to the compressor to rotate the compressor about an axis for starting the engine.

A diagrammatic aerospace gas turbine engine 10 includes a fan 12, a compressor 14, a combustor 16, a turbine 18, a bypass duct 20, and a pyrotechnic air starter 22 as shown in FIG. 1. The compressor 14 is rotatable coupled with the turbine 18 so that both the compressor 14 and the turbine 18 rotate about an axis 11. To start the gas turbine engine 10, the pyrotechnic air starter 22 provides a high-velocity gas 64 that flows through a pyrotechnic gas conduit 60 to direct the high-velocity gas 64 onto an impeller 42 of the compressor 14 to rotate the impeller 42 as suggested in FIG. 3. Illustratively, the discharged high-velocity gas 64 impinges at a desired angle onto impeller blades 48 of the impeller 42.

Figure 2:
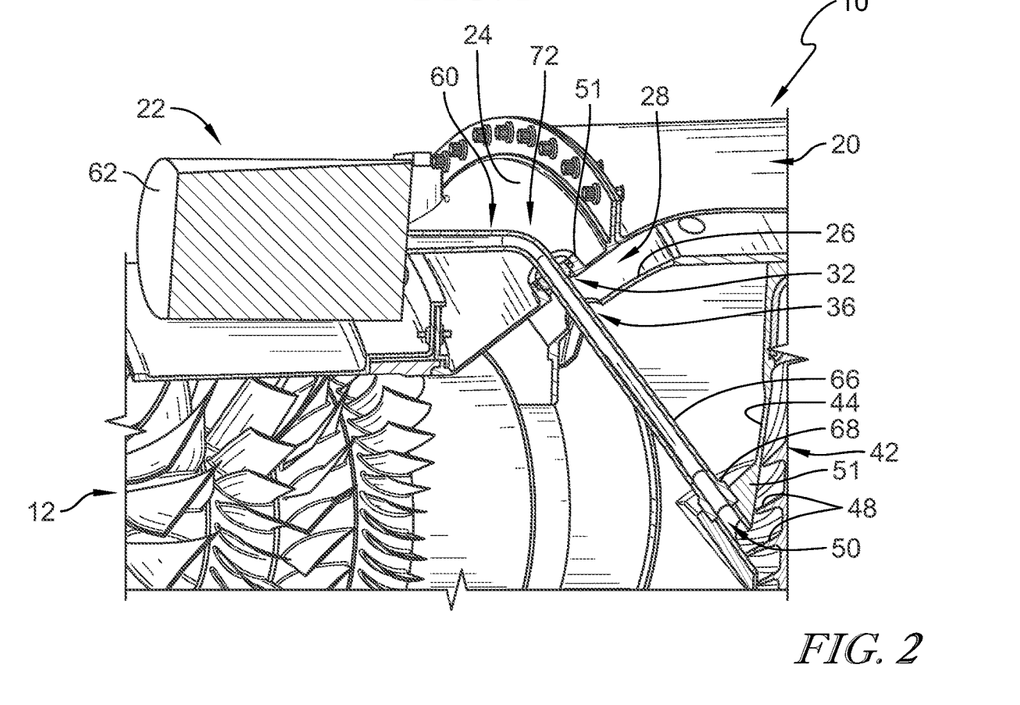
FIG. 2 is a cutaway perspective view of a gas turbine engine in accordance with FIG. 1 revealing a portion of the compressor and the bypass duct and showing that the compressor includes an impeller that rotates about the axis and an impeller shroud located around the impeller, and that a pyrotechnic gas conduit extends through the bypass duct into the impeller shroud to direct the high-pressure gas on to the impeller.
Figure 3:
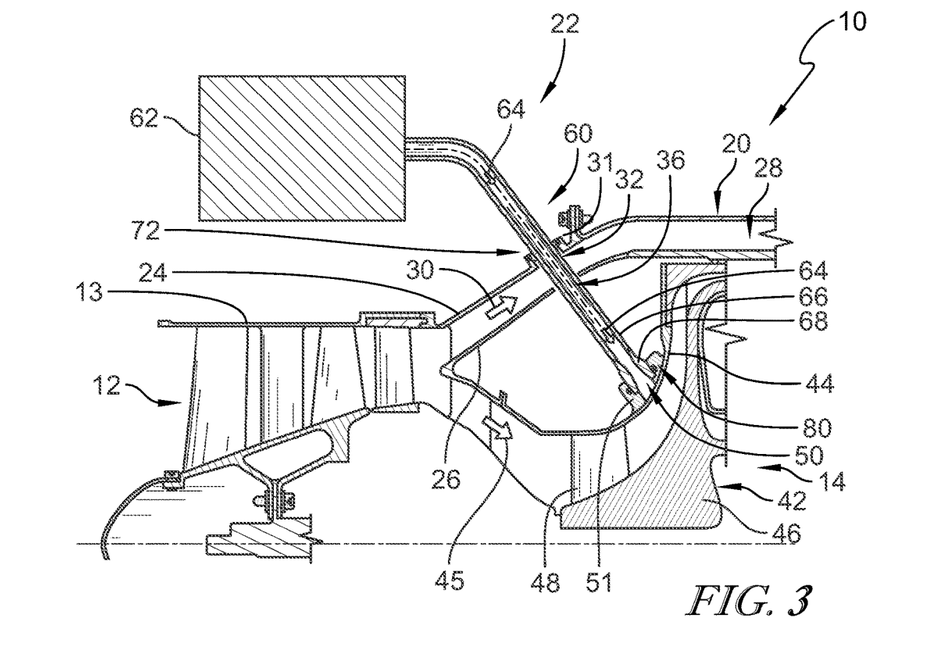
FIG. 3 is a cross-sectional view of a portion of the fan, the compressor, and the bypass duct of the gas turbine engine of FIG. 2 showing the bypass duct includes an outer bypass wall formed to include an outer bypass bore and an inner bypass wall formed to include an inner bypass bore, and the impeller shroud includes a shroud bore, and the pyrotechnic gas conduit extends through the outer bypass bore and the inner bypass bore and locates in the shroud bore.

The pyrotechnic air starter 22 includes a pyrotechnic gas conduit 60 and a pyrotechnic cartridge 62 that supplies the high-velocity gas 64 that flows through the pyrotechnic gas conduit 60 as shown in FIGS. 2 and 3. At least a segment of the pyrotechnic gas conduit 60 extends in a straight path through the bypass duct 20 and locates in an impeller shroud 44 of the compressor 14. The pyrotechnic gas conduit 60 is coupled with the impeller shroud 44 to position the pyrotechnic gas conduit 60 relative to the impeller 42 so that the high-velocity gas 64 is directed onto the impeller 42 to rotate the impeller 42 about the axis 11.

The bypass duct 20 conducts bypass air 30 through the gas turbine engine 10 to provide thrust and propel the gas turbine engine 10. The bypass duct 20 includes an outer bypass wall 24 and an inner bypass wall 26 radially inward of the outer bypass wall 24 as shown in FIGS. 2 and 3. The outer bypass wall 24 and the inner bypass wall 26 extend circumferentially around the axis 11 to form a passageway 28 therebetween. Bypass air 30 flows through the passageway 28 and exits at the aft end of the gas turbine engine 10.

Figure 4:
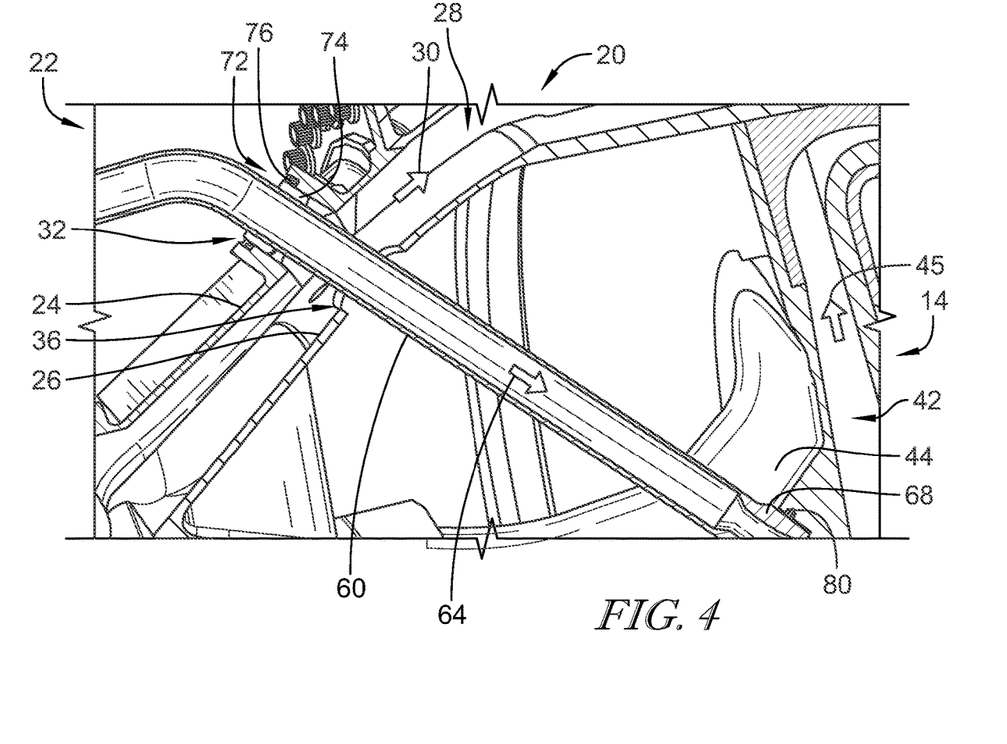
FIG. 4 is a cutaway perspective view of a portion of the bypass duct and compressor of the gas turbine engine of FIG. 2 showing that the outer bypass bore, the inner bypass bore, and the shroud bore are all aligned so that the pyrotechnic gas conduit extends in a straight path from the outer bypass wall to the impeller shroud.

The outer bypass wall 24 extends circumferentially around the axis 11 and forms the outer boundary of the passageway 28 as shown in FIGS. 2-4. In the illustrative embodiment, the outer bypass wall 24 also forms the outer case of the gas turbine engine 10 such that engine accessories may be attached to the outer surface of the outer bypass wall 24. In some embodiments, the outer bypass wall 24 may include a plurality of flanges that extend radially outward from the outer bypass wall 24 so that the outer bypass wall 24 can be coupled to adjacent components or assemblies of the gas turbine engine 10.

The outer bypass wall 24 is formed to include an outer bypass bore 32 that extends radially through the outer bypass wall 24 as shown in FIGS. 2-5. The outer bypass bore 32 is sized to have a first diameter 34. In the illustrative embodiment, the outer bypass wall 24 includes a bypass boss 31 that extends radially outward from the outer bypass wall 24 and the outer bypass bore 32 extends radially through the bypass boss 31 and the outer bypass wall 24.

Figure 6:
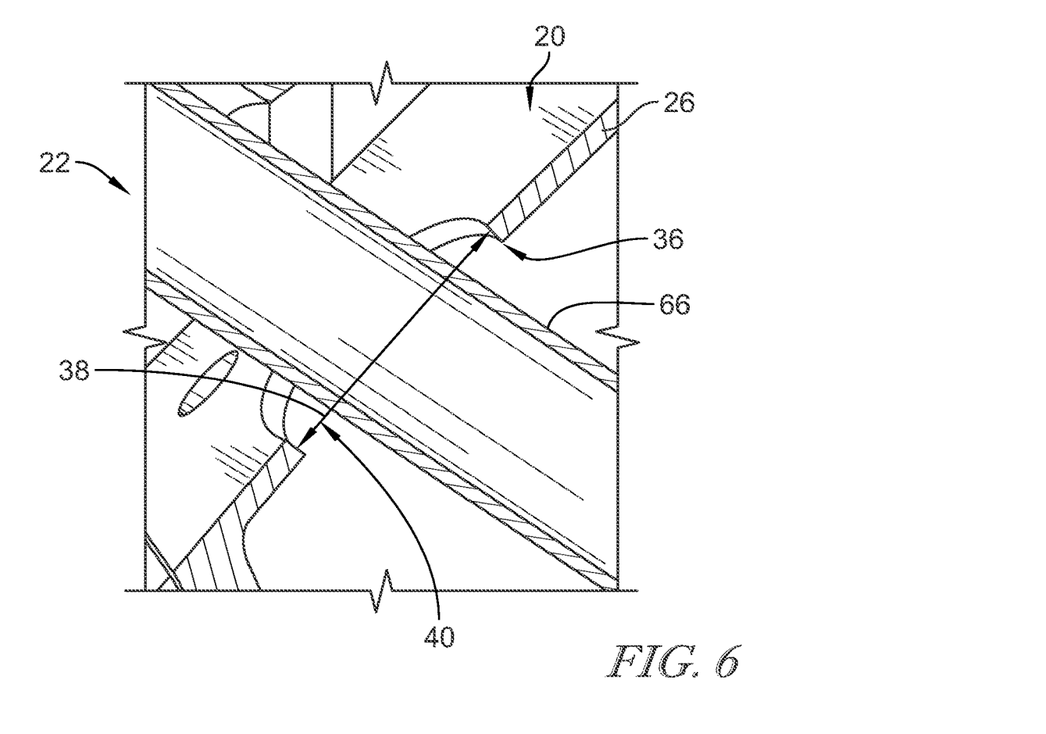
FIG. 6 is a detailed view of the bypass duct of FIG. 4 showing an air gap between the inner bypass wall and the pyrotechnic gas conduit to allow engine air to exhaust into the bypass duct.

The inner bypass wall 26 is located radially inward of the outer bypass wall 24 as shown in FIGS. 2-4. The inner bypass wall 26 extends circumferentially around the axis 11 to form the inner boundary of the passageway 28. The inner bypass wall 26 is formed to include an inner bypass bore 36 that extends radially through the inner bypass wall 26. The inner bypass bore 36 is sized to have a second diameter 38 as shown in FIG. 6. Illustratively, the second diameter 38 is smaller than the first diameter 34. In the illustrative embodiment, the inner bypass wall 26 may include a plurality of flanges that extend radially inward from the inner bypass wall 26 so that the inner bypass wall 26 can be coupled to adjacent components or assemblies of the gas turbine engine 10.

The compressor 14 compresses engine air 45 and delivers compressed air to the combustor 16. The compressor 14 is located radially inward of the inner bypass wall 26 and includes an impeller 42 and an impeller shroud 44 as shown in FIG. 3. The impeller 42 extends circumferentially around the axis 11 and includes a hub 46 and a plurality of blades 48 that extend radially outward away from the hub 46. The impeller 42 rotates about the axis 11 and centrifugal forces from the rotation of the impeller 42 convert kinetic energy in the engine air 45 into potential energy in the form of pressure as the engine air 45 is forced radially outward.

The impeller shroud 44 is located radially outward of the impeller 42 and acts as a seal to block engine air 45 from flowing away from the impeller 42 as shown in FIG. 3. The impeller shroud 44 extends axially aft and radially outward along an outer flow path edge of the impeller 42. The impeller shroud 44 is formed to include a shroud bore 50 that extends radially through the impeller shroud 44. In the illustrative embodiment, the impeller shroud 44 includes a shroud boss 51 that extends radially outward from the impeller shroud 44 and the shroud bore 50 extends radially through the shroud boss 51 and the impeller shroud 44.

Figure 7:
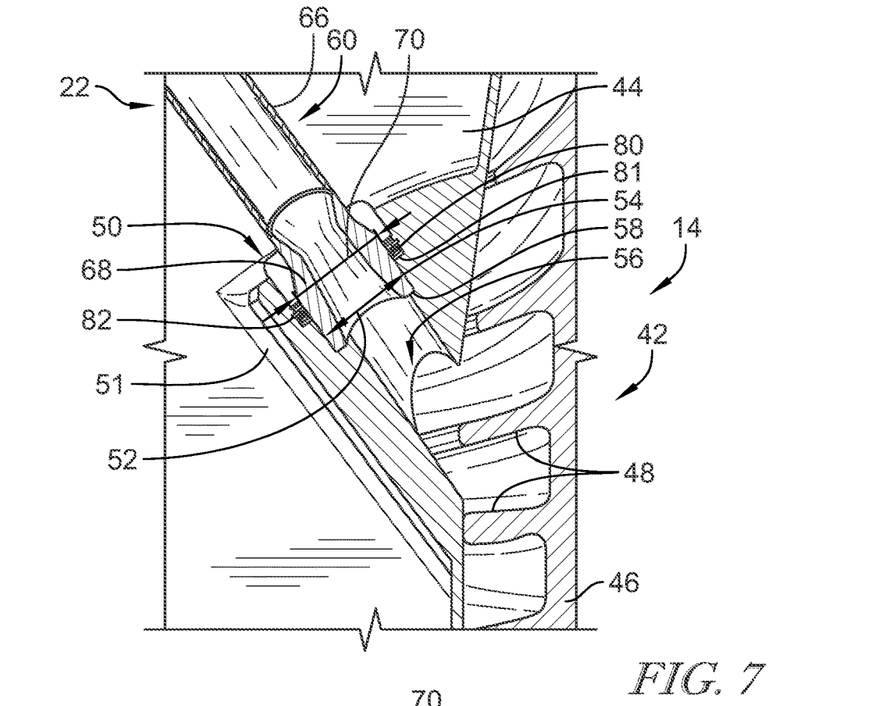
FIG. 7 is a detailed view of the compressor of FIG. 2 showing the shroud bore includes an outer bore radially outward of an inner bore and a locating land formed between the outer bore and the inner bore so that the pyrotechnic gas conduit engages the locating land to position the pyrotechnic gas conduit relative to the impeller.

The shroud bore 50 is formed to include an outer bore 54 and an inner bore 56 radially inward of the outer bore 54 as shown in FIG. 7. The outer bore 54 is sized to have a third diameter 52. The third diameter 52 is less than the first diameter 34 of the outer bypass bore 32 and the second diameter 38 of the inner bypass bore 36 in the illustrative embodiment. The inner bore 56 has a diameter that is smaller than the third diameter 52 of the outer bore 54 so that a locating land 58 is formed between the outer bore 54 and the inner bore 56. Each of the shroud bore 50, the outer bypass bore 32, and the inner bypass bore 36 are aligned in a straight path.

The pyrotechnic air starter 22 is configured to provide and direct high-velocity air 64 on to the plurality of blades 48 of the impeller 42 to rotate the impeller 42 and start the gas turbine engine 10. The discharged high-velocity gas 64 impinges at the desired angle onto the impeller blades 48 in the illustrative embodiment. The pyrotechnic air starter 22 includes the pyrotechnic gas conduit 60 and the pyrotechnic cartridge 62 as shown in FIGS. 2 and 3. The pyrotechnic cartridge 62 is located radially outward of the outer bypass wall 24 and is mounted to an external case of the gas turbine engine 10. In the illustrative embodiment, the pyrotechnic cartridge 62 is mounted to the fan case 13 which is arranged around the fan 12 as suggested in FIG. 3. In some embodiments, the pyrotechnic cartridge may be mounted to the outer bypass wall 24.

The pyrotechnic gas conduit 60 extends away from the pyrotechnic cartridge 62, through the bypass duct 20, and locates in the impeller shroud 44 to direct the high-velocity gas 64 onto the impeller 42 as shown in FIGS. 2 and 3. The pyrotechnic gas conduit 60 extends in a straight path between the outer bypass wall 24 and the impeller shroud 44 to reduce pressure losses of the high-velocity gas 64. The pyrotechnic gas conduit 60 include a tube 66 and a nozzle 68 coupled to the tube 66 at the terminating end of the tube 66. The tube 66 extends through the bypass duct 20 and the nozzle 68 is located in the impeller shroud 44.

The tube 66 extends in a straight path through the outer bypass bore 32 and the inner bypass bore 36 as shown in FIGS. 2-6. An air gap 40 is formed by the clearance between the tube 66 and the inner bypass bore 36 as shown in FIG. 6. The air gap 40 allows engine air 45 leakage from the compressor 14 to flow into the bypass duct 20. The air gap 40 also allows bypass air 30 to flow into the cavity between the inner bypass wall 26 and the impeller shroud 44.

Figure 5:
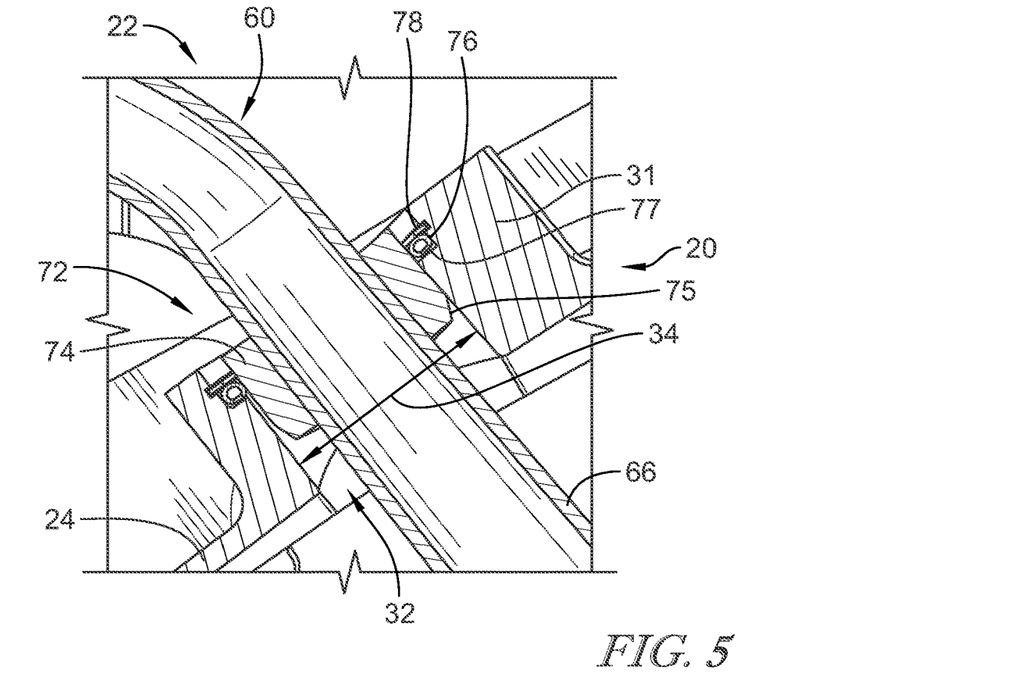
FIG. 5 is a detailed view of the bypass duct of FIG. 4 showing the bypass duct includes a seal assembly located in the outer bypass bore that seals between the outer bypass wall and the pyrotechnic gas conduit.

The bypass duct 20 further includes a tube mount 72 that engages the tube 66 and the outer bypass wall 24 to seal therebetween as shown in FIG. 5. The tube mount 72 blocks bypass air 30 from passing through the outer bypass bore 32 and between the tube 66 and the outer bypass wall 24. The tube mount 72 includes a tube collar 74, a first seal 76, and a retention plate 78. The tube collar 74 extends around and seals against the tube 66. The tube collar 74 is located in the outer bypass bore 32 along a portion of the tube 66.

The first seal 76 is located between and engages the tube collar 74 and the outer bypass wall 24 to seal therebetween as shown in FIG. 5. In the illustrative embodiment, the first seal 76 seals between the tube collar 74 and the bypass boss 31. The first seal 76 locates on a seal land 77 formed in the bypass boss 31. The first seal 76 is illustratively a metallic C-seal to endure with the hot temperatures of the high-velocity gas 64 flowing through the tube 66. In some embodiments, the first seal 76 may have a different configuration and material suitable for the hot conditions of a gas turbine engine. The retention plate 78 extends circumferentially around the tube collar 74 and is positioned radially outward of the first seal 76. The retention plate 78 locates in a groove of the bypass boss 31 to block radial and axial movement of the retention plate 78. Movement along an axis of the tube 66 of the first seal 76 is blocked inward by the seal land 77 of the bypass boss 31 and outward by the retention plate 78.

The nozzle 68 is coupled to the tube 66 and locates in the shroud bore 50 of the impeller shroud 44. The nozzle 68 is formed to include converging-diverging shaped nozzle that accelerates the high-velocity gas 64 onto the plurality of blades 48 included in the impeller 42. The nozzle 68 engages the locating land 58 to position the nozzle 68 and pyrotechnic gas conduit 60 relative to the impeller 42. The nozzle 68 is positioned relative to the plurality of blades 48 so that the high-velocity gas 64 is directed at the plurality of blades 48. This increases the force applied by the high-velocity gas 64 on the impeller 42 to generate torque and rotate the impeller 42 at startup of the gas turbine engine 10. The nozzle 68 has an outer diameter 70. The outer diameter 70 is smaller than first diameter 34, the second diameter 38, and the third diameter 52 to allow the nozzle 68 to pass through each of the bores during installation.

Figure 8:
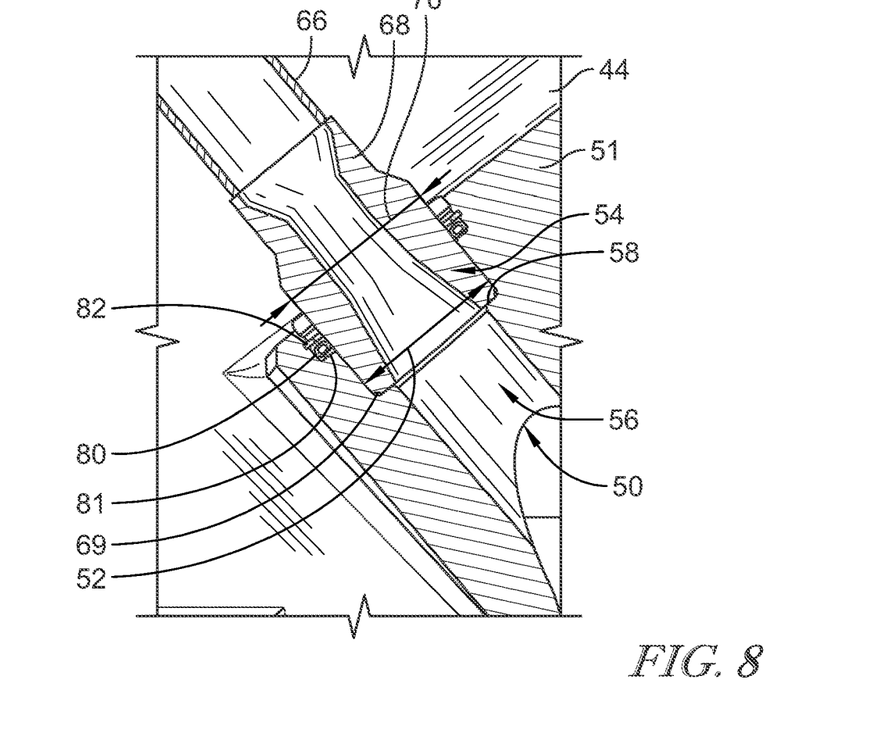
FIG. 8 is a detailed view of the compressor of FIG. 2 showing a second seal located in the shroud bore that seals between the pyrotechnic gas conduit and the impeller shroud.

The impeller shroud 44 further includes a second seal 80 that seals between the nozzle 68 and the impeller shroud 44 as shown in FIGS. 7 and 8. The second seal 80 blocks engine air 45 from passing through the shroud bore 50. In the illustrative embodiment, the second seal 80 seals between the nozzle 68 and the shroud boss 51. The second seal 80 locates on a seal land 81 formed in the shroud boss 51. The second seal 80 is illustratively a metallic C-seal to endure with the hot temperatures of the high-velocity gas 64 flowing through the pyrotechnic gas conduit 60. In some embodiments, the second seal 80 may have a different configuration and material suitable for the hot conditions of a gas turbine engine. A retention plate 82 extends circumferentially around the nozzle 68 and is positioned radially outward of the second seal 80. The retention plate 82 locates in a groove in the shroud boss 51 to block radial and axial movement of the retention plate 82. Movement along an axis of the tube 66 of the second seal 80 is blocked inward by the seal land 81 of the shroud boss 51 and outward by the retention plate 82.

To start the engine 10, the pyrotechnic air starter 22 is assembled to the engine 10. The nozzle 68 of the pyrotechnic gas conduit 60 is aligned with the outer bypass bore 32, and the pyrotechnic gas conduit 60 is extended radially inward so that the pyrotechnic gas conduit 60 extends through the outer bypass bore 32 and the inner bypass bore 36 and locates in the shroud bore 50 of the impeller shroud 44. The nozzle 68 includes a chamfer 69 on the radially inward surface so that it can be slideably assembled past the second seal 80. The tube collar 74 also includes a chamfer 75 on the radially inward surface so that it can be slideably assembled past the first seal 76.

Figure 9:
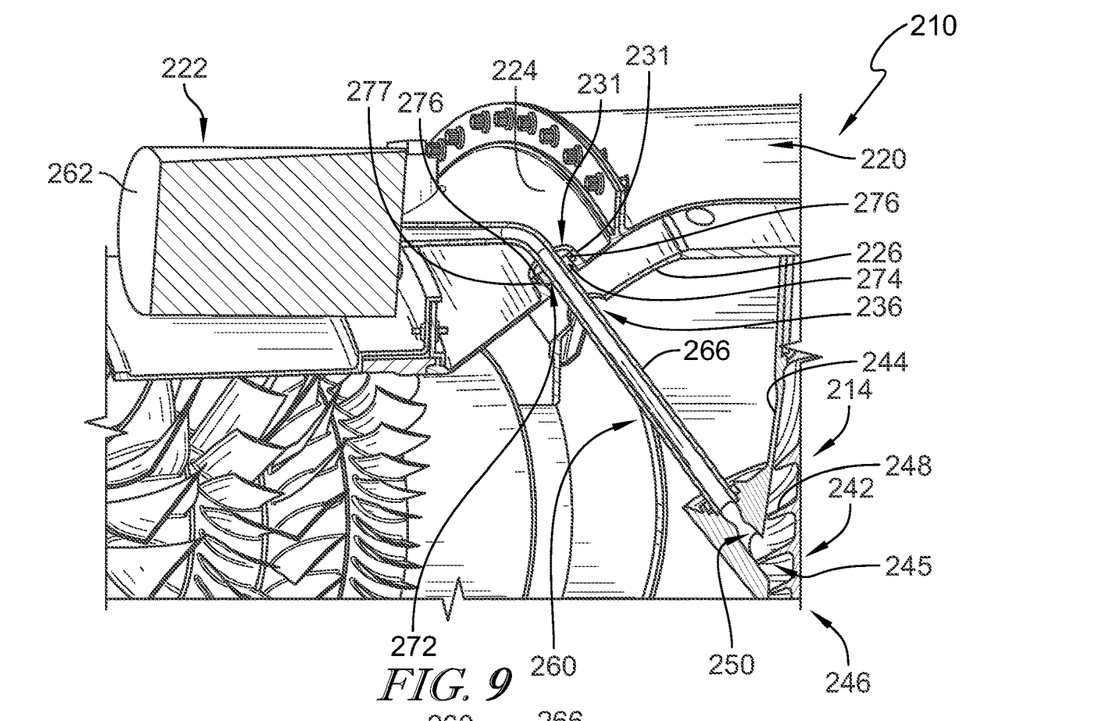
FIG. 9 is a cutaway perspective view of a portion of another gas turbine engine showing a converging-diverging nozzle is formed in the impeller shroud, and the pyrotechnic gas conduit is a straight tube that extends through the bypass duct and locates in the impeller shroud to direct the high-pressure gas through the nozzle formed in the impeller shroud and on to the impeller.
Figure 10:
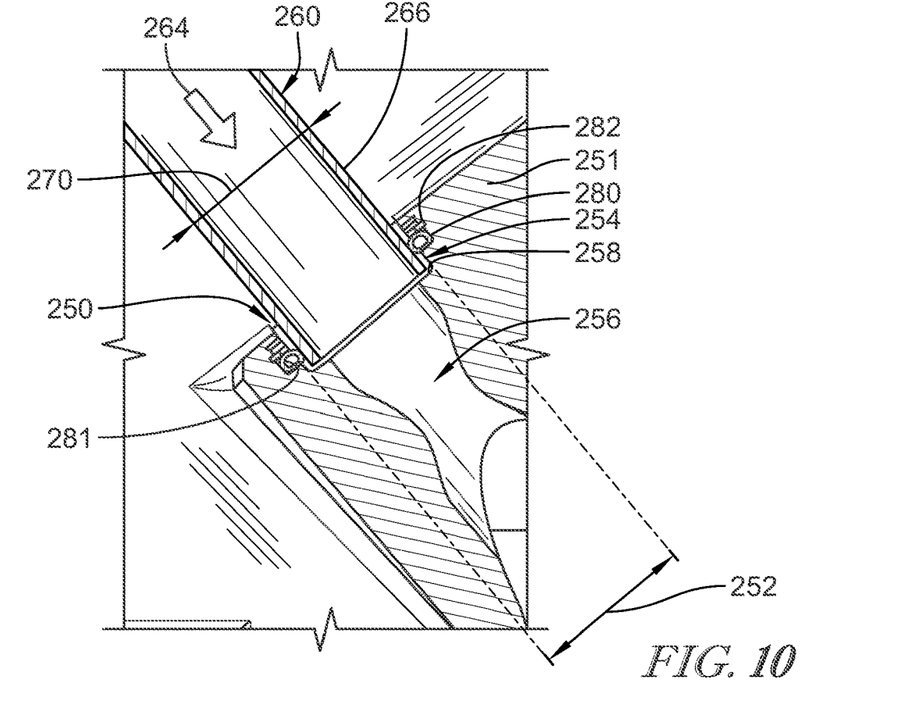
FIG. 10 is a detailed view of the compressor of FIG. 9 showing the shroud bore includes an outer bore radially outward of an inner bore and a locating land formed between the outer bore and the inner bore so that the pyrotechnic gas conduit engages the locating land to position the pyrotechnic gas conduit relative to the impeller, and the nozzle is formed in the inner bore of the impeller shroud.

Another embodiment of a gas turbine engine 210 in accordance with the present disclosure is shown in FIGS. 9 and 10. The gas turbine engine 210 is substantially similar to the gas turbine engine 10 shown in FIGS. 1-8 and described herein. Accordingly, similar reference numbers in the 200 series indicate features that are common between the gas turbine engine 210 and the gas turbine engine 10. The description of the gas turbine engine 10 is incorporated by reference to apply to the gas turbine engine 210, except in instances when it conflicts with the specific description and the drawings of the gas turbine engine 210.

The gas turbine engine 210 includes a compressor 214, a bypass duct 220, and a pyrotechnic air starter 222 as shown in FIG. 9. The nozzle for the air starter is integrally formed with an impeller shroud 244 of the compressor 214.

The bypass duct 220 includes an outer bypass wall 224 and an inner bypass wall 226 radially inward of the outer bypass wall 224. The outer bypass wall 224 is formed to include an outer bypass bore 232 that extends radially through the outer bypass wall 224. In the illustrative embodiment, the outer bypass wall 224 includes a bypass boss 231 that extends radially outward from the outer bypass wall 224 and the outer bypass bore 232 extends radially through the boss and the outer bypass wall 224. The inner bypass wall 226 is formed to include an inner bypass bore 236 that extends radially through the inner bypass wall 226.

The compressor 214 is located radially inward of the inner bypass wall 226 and includes an impeller 242 and an impeller shroud 244 as shown in FIG. 9. The impeller 242 includes an impeller hub 246 and a plurality of blades 248 that extend radially outward from the impeller hub 246. The impeller shroud 244 is located radially outward of the impeller 242 and acts as a seal to block engine air 245 from flowing away from the impeller 242. The impeller shroud 244 is formed to include a shroud bore 250 that extends radially through the impeller shroud 244. In the illustrative embodiment, the impeller shroud 244 includes a shroud boss 251 that extends radially outward from the impeller shroud 244 and the shroud bore 250 extends radially through the shroud boss 251 and the impeller shroud 244.

The shroud bore 250 is formed to include an outer bore 254 and a nozzle shaped inner bore 256 radially inward of the outer bore 254. The outer bore 254 is sized to have a diameter equal to a third diameter 252. The nozzle shaped inner bore 256 is formed to include converging-diverging shaped nozzle that accelerates high-velocity gas 264 onto the impeller 242. The nozzle shaped inner bore 256 is positioned in the impeller shroud 244 so that the high-velocity gas 264 is directed at the plurality of blades 248 included in the impeller 242. The nozzle shaped inner bore 256 has a maximum diameter at a radially outer end that is smaller than the third diameter 252 of the outer bore 254 so that a locating land 258 is formed between the outer bore 254 and the nozzle shaped inner bore 256.

The pyrotechnic air starter 222 is configured to provide and direct high-velocity air 264 on to the plurality of blades 248 of the impeller 242 to rotate the impeller 242 and start the gas turbine engine 210. The pyrotechnic air starter 222 includes the pyrotechnic gas conduit 260 and a pyrotechnic cartridge 262 as shown in FIG. 9. The pyrotechnic cartridge 262 is located radially outward of the outer bypass wall 224 and is mounted to an external case of the gas turbine engine 210.

The pyrotechnic gas conduit 260 extends away from the pyrotechnic cartridge 262, through the bypass duct 220, and locates in the impeller shroud 244 as shown in FIG. 9. The pyrotechnic gas conduit 260 includes a tube 266 that extends in a straight path through the bypass duct 220 and locates in the shroud bore 250 of the impeller shroud 244 as shown in FIG. 10. The tube 266 has a diameter equal to an outer diameter 270. The outer diameter 270 is less than the third diameter 252. The tube 266 engages the locating land 258 to position the tube 266 relative to the impeller 242. The tube 266 is located radially outward of the nozzle shaped inner bore 256 and directs high-velocity gas 264 through the nozzle shaped inner bore 256 so that the high-velocity gas 264 is accelerated and impinged on the plurality of blades 248 of the impeller 242.

The bypass duct 220 further includes a tube mount 272 that engages the tube 266 and the outer bypass wall 224 to seal therebetween as shown in FIG. 9. The tube mount 272 includes a tube collar 274, a first seal 276, and a retention plate 278. The tube collar 274 extends around and seals against the tube 266. The first seal 276 is located between and engages the tube collar 274 and the outer bypass wall 224 to seal therebetween. The retention plate 278 extends circumferentially around the tube collar 274 and is positioned radially outward of the first seal 276. The retention plate 278 locates in a groove in the outer bypass wall 224 to block radial and axial movement of the retention plate 278. Movement along the axis of the tube 266 of the first seal 276 is blocked inward by a seal land 277 included in the outer bypass wall 224 and outward by the retention plate 278.

The impeller shroud 244 further includes a second seal 280 that seals between the tube 266 and the impeller shroud 244 as shown in FIG. 10. The second seal 280 blocks engine air 245 from passing through the shroud bore 250. The second seal 280 is illustratively a metallic C-seal to endure with the hot temperatures of the high-velocity gas 264 flowing through the pyrotechnic gas conduit 260. A retention plate 282 extends circumferentially around the tube 266 and is positioned radially outward of the second seal 280. The retention plate 282 locates in a groove in the impeller shroud 244 to block radial and axial movement of the retention plate 282. Movement along the axis of the tube 266 of the second seal 280 is blocked inward by a seal land 281 included in the impeller shroud 244 and outward by the retention plate 282.

Figure 11:
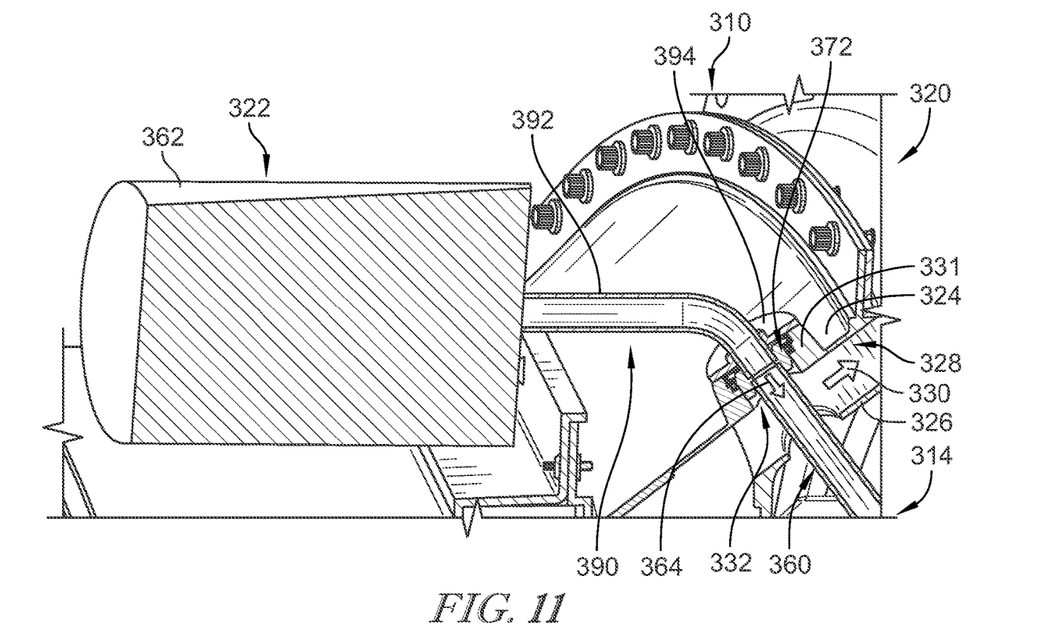
FIG. 11 is a cutaway perspective view of a portion of another gas turbine engine showing the pyrotechnic gas conduit is fixed with the gas turbine engine and extends away from the outer bypass wall, and the pyrotechnic air starter further includes a pyrotechnic cartridge module that includes a tube and a flange coupled to the tube, and the flange is coupled to the outer bypass wall to direct high-pressure gas from the pyrotechnic cartridge module into the pyrotechnic gas conduit.
Figure 12:
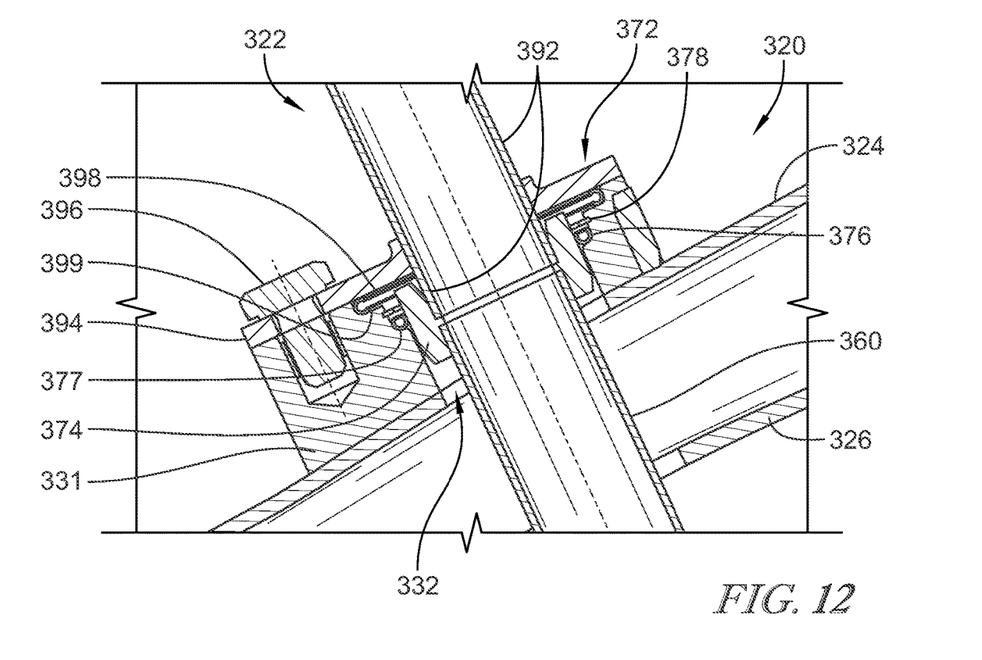
FIG. 12 is a detailed view of the gas turbine engine of FIG. 11 showing the outer bypass wall includes a boss that extends from the outer bypass wall, the flange of the pyrotechnic cartridge module is coupled to the boss of the outer bypass wall, and a seal is located between the boss and the flange to block bypass air exhausting past the flange.

Another embodiment of a gas turbine engine 310 in accordance with the present disclosure is shown in FIGS. 11 and 12. The gas turbine engine 310 is substantially similar to the gas turbine engine 10 shown in FIGS. 1-8 and described herein. Accordingly, similar reference numbers in the 300 series indicate features that are common between the gas turbine engine 310 and the gas turbine engine 10. The description of the gas turbine engine 10 is incorporated by reference to apply to the gas turbine engine 310, except in instances when it conflicts with the specific description and the drawings of the gas turbine engine 310.

The gas turbine engine 310 includes a compressor 314, a bypass duct 320, and a pyrotechnic air starter 322 as shown in FIG. 11. A pyrotechnic cartridge 362 is configured to be separately coupled or removed from the remainder of the pyrotechnic air starter 322 in the gas turbine engine 310.

The bypass duct 320 includes an outer bypass wall 324 and an inner bypass wall 326 radially inward of the outer bypass wall 324. The outer bypass wall 324 and the inner bypass wall 326 extend circumferentially around the axis to form a passageway 328 therebetween. Bypass air 330 flows through the passageway 328 and exits at the aft end of the gas turbine engine 310.

The outer bypass wall 324 extends circumferentially around the axis and forms the outer boundary of the passageway 328 as shown in FIGS. 11 and 12. In the illustrative embodiment, the outer bypass wall 324 also forms the outer case of the gas turbine engine 310 such that engine accessories may be attached to the outer surface of the outer bypass wall 324. The outer bypass wall 324 includes a bypass boss 331 that extends radially outward from the outer bypass wall 324. The bypass boss 331 is formed to include an outer bypass bore 332 that extends radially through the bypass boss 331.

The pyrotechnic air starter 322 is configured to provide and direct high-velocity air 364 on to the compressor 314 to rotate the compressor 314 and start the gas turbine engine 310. The pyrotechnic air starter 322 includes a pyrotechnic gas conduit 360, a pyrotechnic cartridge 362, and a pyrotechnic joining assembly 390 as shown in FIG. 11. The pyrotechnic cartridge 362 is located radially outward of the outer bypass wall 324 and is mounted to an external case of the gas turbine engine 310.

The pyrotechnic joining assembly 390 includes an assembly tube 392 and a flange 394 as shown in FIGS. 11 and 12. The assembly tube 392 extends away from the pyrotechnic cartridge 362 and is shaped so that the terminating end of the assembly tube is orientated in the same direction as the pyrotechnic gas conduit 360. In the illustrative embodiment, the assembly tube 392 includes a single bend to orientate the terminating end of the assembly tube 392 in the same direction as the pyrotechnic gas conduit 360. The flange 394 couples with the bypass boss 331. In the illustrative embodiment, the flange 394 is formed to include a bolt hole, and a bolt 396 extends through the bolt hole to couple the flange 394 with the bypass boss 331. The assembly tube 392 extends a short distance radially inward of the flange 394 to couple with a tube mount 372.

The pyrotechnic gas conduit 360 is installed in the engine 310 prior to the assembly of the pyrotechnic cartridge 362 and pyrotechnic joining assembly 390 to the engine 310. This avoids blind assembly of the pyrotechnic gas conduit 360 into the engine and possible damage to seals and other internal components of the engine 310. The pyrotechnic gas conduit 360 extends through the bypass duct 320 and locates in an impeller shroud included in the compressor 314.

The pyrotechnic gas conduit 360 is coupled in the engine radially between the impeller shroud and the outer bypass wall 324. The impeller shroud blocks axial and circumferential movement and inward radial movement of the radially inner end of the pyrotechnic gas conduit 360. The tube mount 372 and the outer bypass wall 324 block axial and circumferential movement and outward radial movement of the outer radial end of the pyrotechnic gas conduit 360.

The bypass duct 320 further includes the tube mount 372 that engages the pyrotechnic gas conduit 360 and the bypass boss 331. The tube mount 372 includes a tube collar 374, a first seal 376, and a retention plate 378 as shown in FIG. 12. The tube collar 374 extends around a radially outer end of the pyrotechnic gas conduit 360 and extends radially outward to receive a terminating end of the assembly tube 392. The tube collar 374 is arranged around the radially outer end of the pyrotechnic gas conduit 360 and the terminating end of the assembly tube 392.

The first seal 376 is located between and engages the tube collar 374 and the bypass boss 331 to seal therebetween. The retention plate 378 extends circumferentially around the tube collar 374 and is positioned radially outward of the first seal 376. The retention plate 378 locates in a groove of the bypass boss 331 to block radial and axial movement of the retention plate 378. Movement along the axis of the tube 366 of the first seal 376 is blocked inward by the seal land 377 included in the bypass boss 331 and outward by the retention plate 378.

The tube mount 372 further includes a flange seal 398 that seals between a second seal land 399 formed in the bypass boss 331 and the flange 394. The flange seal 398 and the first seal 376 block bypass air 330 from passing between the pyrotechnic gas conduit 360 and the outer bypass wall 324. In the illustrative embodiment, the flange seal 398 is a metallic C-seal to endure the hot temperatures of the high-velocity gas 364 flowing through the pyrotechnic gas conduit 360. In some embodiments, the flange seal 398 may have a different configuration and material suitable for the hot conditions of a gas turbine engine.

The present disclosure may provide a device and method to start a low cost or expendable gas turbine engine 10. The method may use a pyrotechnic air starter 22 to emit high-velocity gas 64. This high-velocity gas 64 may be accelerated through a nozzle 68 to impinge on the compressor impeller blades 48. The gas momentum may be employed overcome the rotor inertia and to turn the high speed rotor comprised of a compressor 14 and a turbine 18. In coordination with this, another pyrotechnic cartridge may be discharged in the combustor 16. As the high speed rotor spins, it may turn a fuel pump which may push fuel to the combustor 16. Once in the combustor 16, the fuel may ignite due to the intense flame of the igniter pyrotechnic discharge. As the fuel burns, the gas turbine engine 10 may continue to build in speed until stable operation is obtained. The pyrotechnic air starter system 22 is shown in FIGS. 1-3.

The pyrotechnic air starter cartridge 62 and the igniter cartridge may be considered to be explosive devices. As such, they may be kept separate from the air vehicle until they are ready to be deployed. At that time they may be installed on the gas turbine engine 10. The air starter cartridge 62 is envisioned to have a long gas conduit 60 attached that may install from the outside of the gas turbine engine 10 and may be inserted into a bore 50 in a boss 51 on the compressor shroud 44. In some embodiments, the tube may be straight. Further, the discharged high-velocity gas 64 may impinge at the desired angle onto the impeller blades 48. FIG. 2 shows a perspective cut away view of the engine and illustrates the angular alignment of the gas conduit 60 and air starter cartridge 62 relative to the engine centerline 11.

The installation of the gas conduit 60 may cross the bypass duct 20. There may be a boss on the front frame 24 that houses a first metallic seal 76 that interfaces with the starter air gas conduit 60. The inner bypass wall 26 of the bypass duct 20 has a clearance hole 36. This may allow compressor bleed air to flow into the bypass duct 20. In some embodiments, the air may ingress into the compressor flow path. There may also be a boss on the compressor shroud 44, which holds another second metallic seal 80. This second seal 80 may have a smaller diameter than the outboard seal 76 to allow for assembly of the gas conduit 60. The seal bores 32, 50 may be on the same centerline with the gas conduit 60. At the end of the gas conduit 60 there may be a converging-diverging nozzle 68 that accelerates the cartridge discharge high-velocity gas 64. FIGS. 3 and 4 show cross-section views of the starter air gas conduit 60.

A detail view of the metallic seal joint 72 with the front frame 24 is shown in FIG. 5. A metallic C-seal 76 may be used due to the high temperature expected from the air starter cartridge discharge 64. A retaining plate 78 may trap the first seal 76 in the front frame seal bore 32. The C-seal 76 is open to higher pressure from the bypass flow stream, which may help to energize the C-seal 76. The collar 74 on the tube 60 may have a generous lead-in chamfer 75 to help during installation. The nozzle 68 at the tip of the tube 60 may be able to freely pass through the C-seal 76 without contact.

FIG. 6 is a view of the inner bypass wall 26 interface. There may be a large clearance hole 36 around the starter air gas conduit 60. This gap 40 along with a series of smaller holes may be utilized for the compressor bleed flow circuit.

A detail view of the metallic seal joint 80 with the compressor 14 along with the converging-diverging nozzle 68 is shown in FIGS. 7 and 8. Another metallic C-seal 80 may be used due to the expected temperatures. A retaining ring 82 may secure the C-seal 80 within the cavity in the compressor shroud boss 51. This may allow the C-seal 80 to be pre-installed in the gas turbine engine 10 and remain in place prior to installation of the air starter gas conduit 60. The C-seal 80 may open facing the higher pressure of the compressor flow path. The nozzle 68 may have a lead-in chamfer 69 to engage the C-seal 80 during assembly as the installation is blind. There may be a shoulder 58 at the bottom of the boss that acts as a stop to position the nozzle 68 relative to the compressor flow path.

The impeller 42 may be made from titanium, which may cause the high-velocity gas 64 to burn a hole through the impeller blades 48. However, the air starter cartridge 62 can be customized to control the temperature and burn time of the high-velocity gas 64. This may allow the use of hot gas, but not to the degradation of the impeller 42.

In another embodiment of the present disclosure, the pyrotechnic air starter 322 may have a joint in the starter air gas conduit 360 such that the portion that engages the two metallic seals 376, 380 would remain assembled with the gas turbine engine 310. The starter air cartridge 362 may be mated to the starter air gas conduit 360 immediately before vehicle deployment. This may assure that the seals 376, 380 would not be damaged during tube 360 installation. Having a permanently installed tube may eliminate wear of the seals 376, 380 and potential deficiency. FIGS. 11 and 12 show this embodiment.

FIGS. 11 and 12 show a detail view of the bolted joint for the pyrotechnic air starter 322. The joining tube 390 from the starter air cartridge 362 may assemble into the tube collar 374 on the permanently installed gas conduit 360 on the gas turbine engine 310. This may be a loose fit, so two metallic C-seals 376, 398 may be used to block air from escaping away from the bypass duct 320 and into the ambient atmosphere. The bolted flange 392 may have a clocking feature to enable it to be installed in a single orientation. The starter air cartridge 362 may be removed and installed multiple times. Only the face C-seal 398 could be replaced after being used.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine having a pyrotechnic starter, the gas turbine engine comprising:
   a bypass duct configured to conduct bypass air through the gas turbine engine to provide thrust for propelling the gas turbine engine, the bypass duct including an inner bypass wall arranged circumferentially about an axis and an outer bypass wall arranged circumferentially about the inner bypass wall to define a passageway for the bypass air radially between the outer bypass wall and the inner bypass wall,
   a compressor configured to produce compressed air and located radially inward of the inner bypass wall, the compressor including an impeller configured to rotate about the axis to produce the compressed air and an impeller shroud arranged circumferentially around the impeller to block the compressed air from flowing away from the impeller, and
   a pyrotechnic gas conduit that extends radially inward through the outer bypass wall and the inner bypass wall and into the impeller shroud to conduct a gas through the bypass duct and the impeller shroud and onto the impeller to rotate the impeller about the axis for starting the gas turbine engine,
   wherein the pyrotechnic gas conduit includes a tube that extends through the outer bypass wall and the inner bypass wall and a nozzle coupled with the tube and the impeller shroud to accelerate the gas onto the impeller,
   wherein the outer bypass wall is formed to define an outer bypass bore with a first diameter that extends radially through the outer bypass wall, the inner bypass wall is formed to define an inner bypass bore with a second diameter that extends radially through the inner bypass wall, and the impeller shroud is formed to define a shroud bore with a third diameter that extends radially into the impeller shroud, and wherein the first diameter is larger than the second diameter and the second diameter is larger than the third diameter.

2. The gas turbine engine of claim 1, wherein the pyrotechnic gas conduit extends along a straight path between the outer bypass wall and the impeller shroud.

3. The gas turbine engine of claim 1, wherein the outer bypass wall is formed to define an outer bypass bore that extends radially through the outer bypass wall and the bypass duct further includes a tube mount coupled with the pyrotechnic gas conduit and located in the outer bypass bore, the tube mount includes a tube collar that extends circumferentially around the pyrotechnic gas conduit and a first seal that engages the tube collar and the outer bypass wall to block the bypass air from passing through the outer bypass bore.

4. The gas turbine engine of claim 3, wherein the impeller shroud is formed to define a shroud bore that extends radially into the impeller shroud, the pyrotechnic gas conduit is received in the shroud bore, and the impeller shroud further includes a second seal that engages the pyrotechnic gas conduit and the impeller shroud to block the compressed air from passing through the shroud bore.

5. The gas turbine engine of claim 4, wherein the shroud bore includes an outer bore, an inner bore, and a locating land between the outer bore and the inner bore, and wherein the pyrotechnic gas conduit engages the locating land to position the pyrotechnic gas conduit relative to the impeller.

6. The gas turbine engine of claim 3, wherein the inner bypass wall is formed to define an inner bypass bore that extends radially through the inner bypass wall and the pyrotechnic gas conduit extends through the inner bypass bore to form an air gap in the inner bypass bore between the inner bypass wall and the pyrotechnic gas conduit.

7. The gas turbine engine of claim 1, wherein the nozzle has an outer diameter and the outer diameter is smaller than the first diameter, the second diameter, and the third diameter so that the pyrotechnic gas conduit can be assembled and extended through each of the outer bypass bore, the inner bypass bore, and the shroud bore.

8. The gas turbine engine of claim 1, wherein the nozzle is integrally formed with the impeller shroud and the tube is coupled directly to the impeller shroud.

9. A gas turbine engine comprising:
   a bypass duct including an inner bypass wall arranged circumferentially about an axis and an outer bypass wall arranged circumferentially about the inner bypass wall,
   a compressor including an impeller configured to rotate about the axis and an impeller shroud arranged circumferentially around the impeller, and
   a pyrotechnic gas conduit that extends radially inward through the outer bypass wall and the inner bypass wall and into the impeller shroud to conduct a gas onto the impeller,
   wherein the outer bypass wall is formed to define an outer bypass bore and the bypass duct further includes a tube mount coupled with the pyrotechnic gas conduit and located in the outer bypass bore, the tube mount includes a tube collar that extends circumferentially around the pyrotechnic gas conduit and a first seal that engages the tube collar and the outer bypass wall.

10. The gas turbine engine of claim 9, wherein the pyrotechnic gas conduit includes a tube and a nozzle coupled to the tube and the impeller shroud to accelerate the gas onto the impeller.

11. The gas turbine engine of claim 9, wherein the outer bypass wall is formed to define an outer bypass bore with a first diameter, the inner bypass wall is formed to define an inner bypass bore with a second diameter, and the impeller shroud is formed to define a shroud bore with a third diameter, wherein the first diameter is larger than the second diameter and the second diameter is larger than the third diameter.

12. The gas turbine engine of claim 11, wherein the outer bypass bore, the inner bypass bore and the shroud bore are aligned so that the pyrotechnic gas conduit extends along a straight path through each of the outer bypass bore, the inner bypass bore and the shroud bore.

13. The gas turbine engine of claim 9, wherein the impeller shroud is formed to define a shroud bore, the pyrotechnic gas conduit is received in the shroud bore, and the impeller shroud further includes a second seal that engages the pyrotechnic gas conduit and the impeller shroud.

14. A method of assembling a gas turbine engine, the method comprising the steps of:

arranging a bypass duct circumferentially around an axis, the bypass duct including an outer bypass wall and an inner bypass wall radially inward of the outer bypass wall so that bypass air can flow therebetween, arranging a compressor radially inward of the bypass duct, the compressor having an impeller configured to rotate around the axis and compress engine air and an impeller shroud arranged circumferentially about the impeller, and extending a pyrotechnic gas conduit radially inward through the bypass duct and into the impeller shroud, wherein the outer bypass wall is formed to include a first bore with a first diameter that extends radially through the outer bypass wall, the inner bypass wall is formed to include a second bore with a second diameter that extends radially through the inner bypass wall, and the impeller shroud is formed to include a third bore with a third diameter that extends radially through the impeller shroud, wherein the first diameter is larger than the second diameter and the second diameter is larger than the third diameter.

15. The method of claim 14, wherein the pyrotechnic gas conduit includes a tube and a nozzle, the tube extends through the outer bypass wall and the inner bypass wall, and the nozzle couples to the tube and the impeller shroud to accelerate gas onto the impeller.

16. The method of claim 14, wherein the method further includes the step of slideably engaging the pyrotechnic gas conduit with a tube mount that engages the pyrotechnic gas conduit and the outer bypass wall to block the bypass air through the first bore and slideably engaging the pyrotechnic gas conduit with a second seal that engages the pyrotechnic gas conduit and the impeller shroud to block the engine air through the third bore, and wherein the tube mount includes a tube collar that extends circumferentially around the pyrotechnic gas conduit and a first seal that engages the tube collar and the outer bypass wall.

* * * * *